June 23, 1959 J. W. WRIGHT 2,891,586
CUTTING SAW CHAIN
Filed Sept. 5, 1956 2 Sheets-Sheet 1
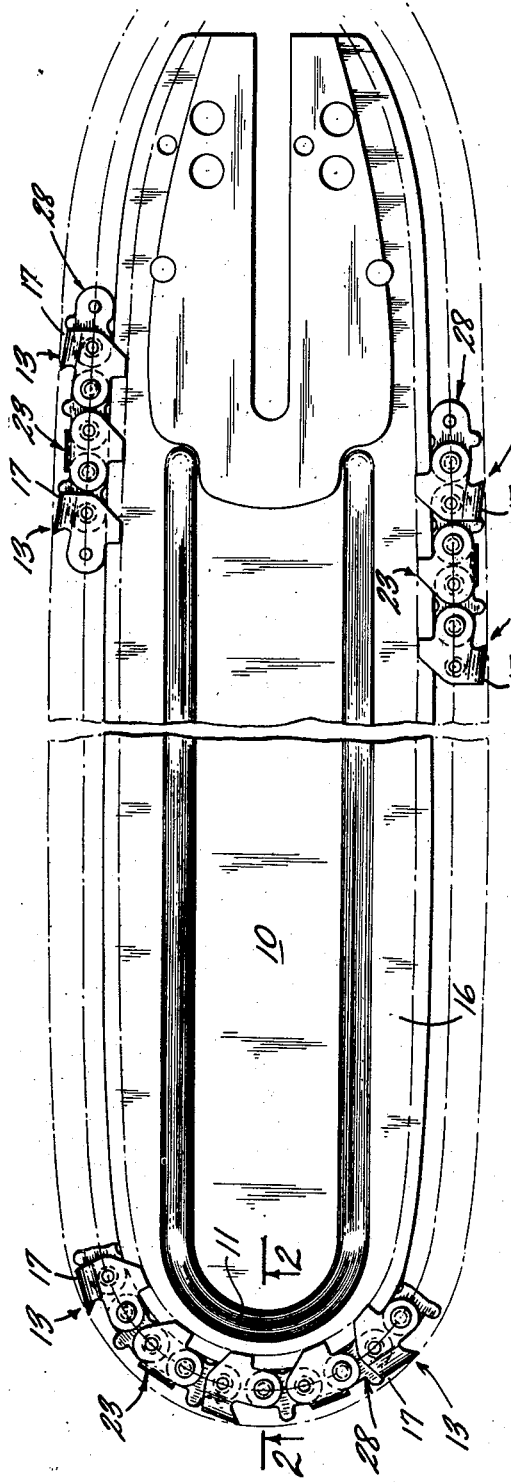
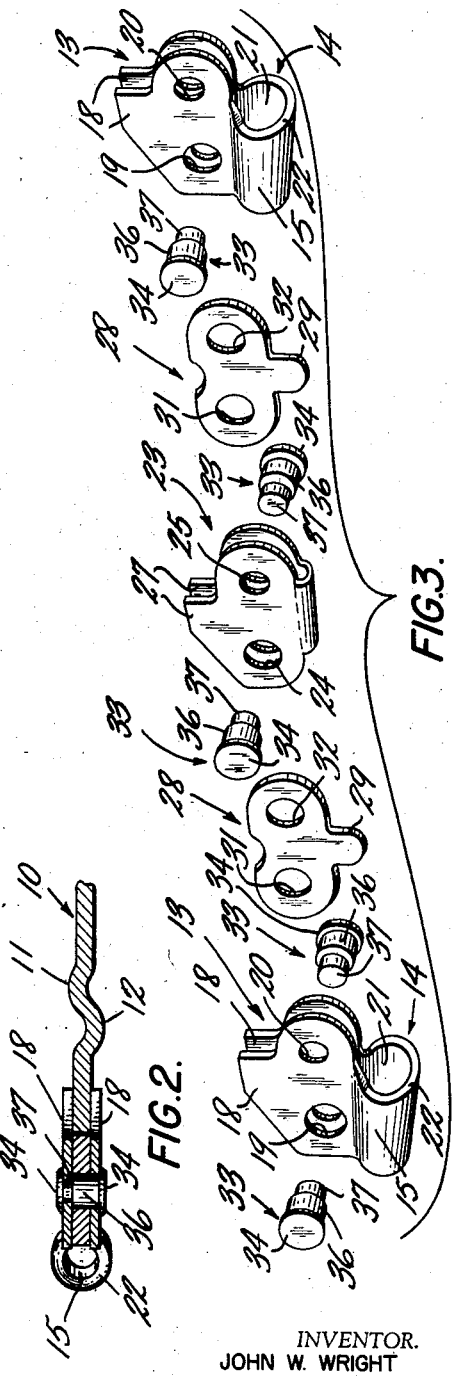
INVENTOR.
JOHN W. WRIGHT
BY
his ATTORNEYS June 23, 1959     J. W. WRIGHT     2,891,586
CUTTING SAW CHAIN
Filed Sept. 5, 1956     2 Sheets-Sheet 2
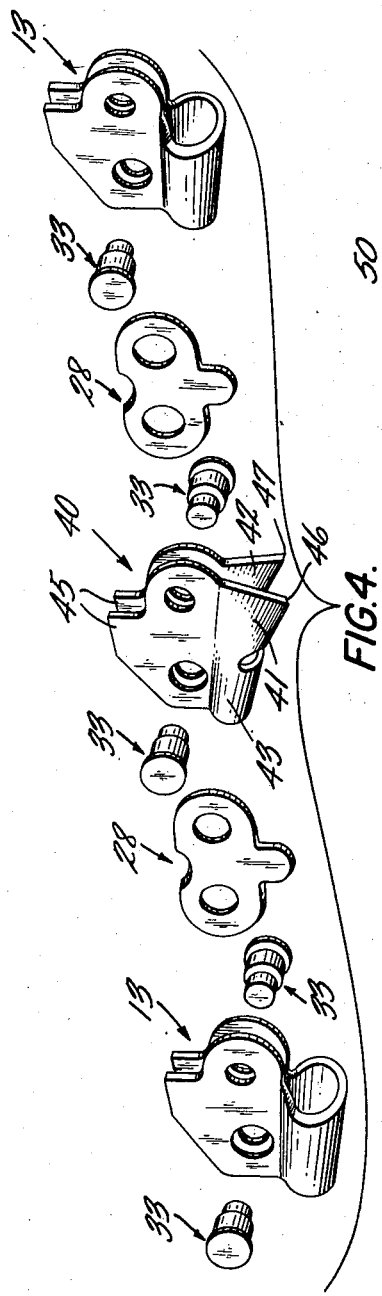
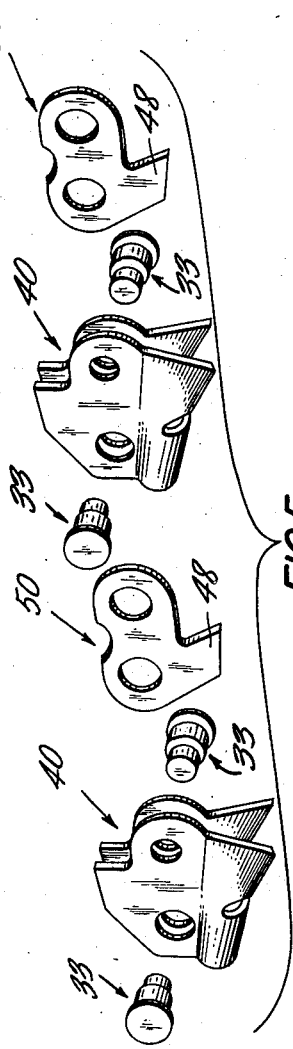
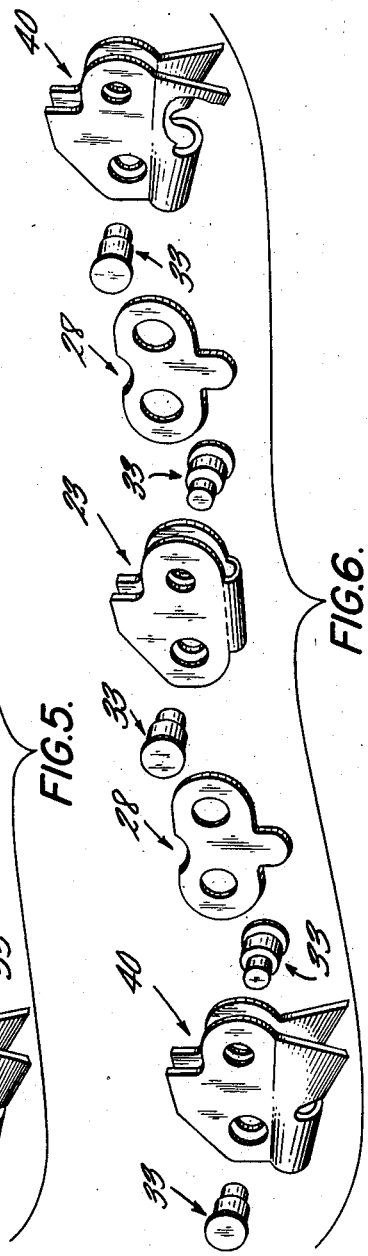
INVENTOR.
JOHN W. WRIGHT
BY
his ATTORNEYS

United States Patent Office 2,891,586
Patented June 23, 1959

2,891,586

CUTTING SAW CHAIN

John W. Wright, Bridgeport, Conn.

Application September 5, 1956, Serial No. 608,100

8 Claims. (Cl. 143—135)

This invention relates generally to saws and more particularly to saw teeth and saw teeth assemblies.

With the saw teeth for chain assemblies heretofore known, it has been necessary to use a relatively thick guide bar with a groove in the center into which projections from the teeth are placed to obtain a stable operation and smooth, straight cutting. Such guide bars were either of a spot-welded laminated construction or a single heavy bar with a milled groove therein.

The present invention provides, in general, an improved type of clipper saw tooth construction whereby a complete balance of cutting forces is obtained. This type of saw tooth construction permits the use of a chain assembly with a one-piece, non-grooved guide bar. The preferred clipper saw tooth presents a continuous cutting edge which cuts both sides and the bottom of a kerf at the same time. Spacer links are connected between the saw teeth to make up the chain assembly.

The advantages of the clipper saw tooth and guide bar of the present invention include a thinner chain due to the balance in the forces acting thereon, less power required to operate this saw, and the smooth, straight cut which is obtained. The invention resides in certain novel features of parts, and further advantages thereof will become apparent to those skilled in the art to which it pertains from the following description of the present preferred embodiment thereof described with respect to the accompanying drawings in which similar reference characters represent corresponding parts in the several views, in which:

Figure 1 is a plan view of one embodiment of the clipper chain and guide bar assembly of the present invention;

Figure 2 is a cross-sectional view taken along the line 2—2 in Figure 1;

Figure 3 is one chain assembly including the clipper tooth and connecting link of the present invention;

Figure 4 is another chain assembly including the clipper tooth and clipper tooth-with-scoring-teeth of the present invention;

Figure 5 is still another chain assembly including the clipper tooth-with-scoring-teeth and connecting link with cutting tooth of the present invention; and Figure 6 is a further chain assembly including the clipper tooth-with-scoring-teeth and connecting link of the present invention.

Referring now to Figure 1 and Figure 2 of the drawings, the guide bar 10 is of the one piece, non-grooved type of construction. The guide rail 16 is stiffened by double ribs 11 and 12 (Fig. 2) forming substantially an S cross section. These ribs 11 and 12 are so formed that approximately one half of the thickness of the metal projects out on one side of the S and one half on the other side of the S. This construction permits the use of relatively thin material such as, for example, material of approximately one-sixteenth inch thick, but with an effective thickness of approximately one-eighth of an inch due to the S rib construction.

The one piece, non-grooved guide bar 10 permits the use of straddle type chains which has the inherent advantage over the grooved type guide bar in that the guide portions are on the outside, thereby providing cooler operation. Use of a straddle type chain with a non-grooved guide bar in the past has been unsuccessful primarily due to the tendency of the chain to move from side to side producing a rough and uneven cut. This disadvantage has been overcome by the present invention by the provision of a lightweight reinforced one piece guide bar 10 with a straddle type tooth 13 which cuts at the bottom and both sides of the kerf at one time, thereby producing a stable, smooth cutting operation.

Referring now to Figure 3 of the drawings, the clipper tooth construction of the present invention permits a complete balance of the cutting forces. This balance of forces is obtained in the present preferred embodiment by the provision of a continuous arcuate cutting edge 14 on the working portion 15 of the saw tooth 13 which permits the cutting edge 14 to cut into the bottom and the sides of the kerf at the same time. A relief or clearance angle 17 is provided rearwardly at the bottom and sides of the working portion 15. The relief angle 17 at the bottom of the working portion 15 is greater than the angle at the sides. This has the effect of leaving a smooth side on the wood while permitting the bottom of the cutting edge to dig in.

Extended spaced apart portions 18 from each side of the working portion 15 form a bifurcated construction to straddle the guide bar 10. The distance between the outer surfaces of the extended portions 18 is less than the distance between the side cutting portions of the cutting edge 14. Suitable apertures 19 and 20 are provided in the clipper tooth 13 for connection in the chain assembly. A channel 21 formed within the working portion 15 is a rearwardly converging taper. This channel 21 will fill with sawdust immediately when the chain is operated and thereby produce a forward movement of the sawdust to maintain the kerf substantially clear.

The cutting edge 14 of the clipper tooth 13 extends forwardly and downwardly at an angle of approximately 30 degrees to permit clean cutting.

The present clipper tooth construction may be produced by a relatively simple manufacturing process. The unit may be stamped from sheet material and the forward rim 22 may be trimmed with shears to provide the cutting edge. No other sharpening operations would be required. The extended portions 18 may then be bent to form the bifurcated extensions. Due to the balance of the forces acting on the present clipper tooth 13, the material from which it is constructed may be relatively thin. For illustration purposes only, the material may be alloy steel.

To provide the chain assembly according to the present invention, a straddle link 23 may be used as a spacer. The straddle link 23 is a substantially U-shaped member with apertures 24 and 25 at each end for connection within the chain assembly. Extended portions 27 are provided to straddle the guide bar 10 and add additional stability to the chain. This type of U-shaped connecting link 23 has an inherent advantage of greater strength and permits placing the clipper teeth 13 at a greater distance apart.

For connecting the clipper teeth 13 to the straddle links 23, a connecting link 28 is provided on which is formed a depth guide 29. Apertures 31 and 32 are located at each end of the connecting link 28 for assembly purposes. The connecting link 28 is located immediately in advance of the clipper tooth 13 and, due to the depth guide 29, prevents the clipper tooth 13 from grabbing and digging in too far.

The rivets 33 which are provided for assembly of the present clipper tooth chain have a head 34 preformed on one end thereof. The body portion 36 extending from the preformed head 34 is relatively thick. The end 37 of the rivet 33 is smaller in diameter than the body portion 36 and extends sufficiently far through the assembled linkage so that it may be "headed" to form a secure connection. The rivets 33 may be inserted alternately from opposite sides of the chain assembly to assure complete balance.

Although the clipper tooth 13 of the present invention has been described for use with a one piece, non-grooved guide bar 10, it is to be understood that this clipper tooth 13 may be modified for use with conventional grooved guide bars. For such use, the extended portions 18 of the clipper tooth 13 may be cut off to form an edge similar to that of the connecting link 28. Each of the two edges thus formed would bear against the two rims of the grooved guide bar. The connecting link 28 would then be modified to form an extension to fit in the grooved guide bar.

It is also to be understood that the clipper tooth of the present invention may be modified and that it is capable of other modifications. One such modification is illustrated in Figure 4 of the drawings. While this modification shows a one piece saw tooth 40 of essentially U-shape cross section to provide a continuous body portion 43, it is so constructed as to have two scoring teeth 41 and 42 with points 46 and 47 which project downwardly and outwardly. In operation the two scoring teeth 41 and 42 will sever the fibers at each side of the bottom of the kerf. This type of saw tooth 40 is held in a stable position during operation due to both sides 45 of the tooth 40 being integrally linked together by the one piece, U-shaped body or working portion 43.

One modification of the connecting link 28 of Figs. 3 and 4 would be as shown in the assembly in Figure 5 of the drawings. A cutting tooth 48 is shown as forming an integral part of the connecting link 50, and may be used to rake out the cut fibers at the bottom of the kerf after they have been severed by the preceding cutting tooth 40.

Obviously, various combinations of the clipper tooth, clipper tooth-with-scoring-teeth, connecting link-with-cutting-tooth, connecting link-with-depth-guide, and straddle link may be used to form a saw assembly. Possible assemblies are shown in Figures 3, 4, 5 and 6 of the drawings. It should be noted, however, that when the clipper tooth 13 is used in combination with the clipper tooth-with-scoring-teeth 40, the clipper tooth-with-scoring-teeth 40 should be dimensioned so that the points 46 and 47 of the scoring teeth 41 and 42 will project about one-sixteenth inch below the lowest arcuate cutting edge of the clipper tooth, and will project to each side for approximately one thirty-second inch beyond the arcuate side edge of the clipper tooth. In such a combination, the clipper tooth 13 would function as a raker rather than as a complete cutting tooth.

It will be understood that the embodiments herein described are merely illustrative of the invention and that modifications can be made and it is capable of other applications. Therefore, it is understood that the invention is not to be limited to any specified form or embodiment except insofar as such limitations are set forth in the claims.

I claim:

1. In a chain saw cutting apparatus having a guide bar support means, a plurality of links connected to form a chain, predetermined ones of said links having a working portion, spaced apart side portions integrally formed with said working portion to straddle said guide bar support means, said spaced-apart side portions providing means for connecting said predetermined ones of said links, said working portion having side cutting edges and a bottom cutting edge, all the cutting edges of said working portion being in a plane perpendicular to the direction of travel of the links such that there is a balance of the forces on each saw tooth during a cutting operation and the distance between said side cutting edges being greater than the distance between said spaced apart side portions.

2. The apparatus of claim 1 wherein the working portion is arcuate in cross-section.

3. The apparatus of claim 1 wherein predetermined ones of the plurality of links having cutting edges are separated by connecting links.

4. The apparatus of claim 1 wherein predetermined ones of the plurality of links having cutting edges are separated by connecting links, and a depth guide formed on predetermined ones of said connecting links.

5. The apparatus of claim 1 wherein predetermined ones of the plurality of links having cutting edges are separated by connecting links and a saw tooth formed on predetermined ones of said connecting links.

6. The apparatus of claim 1 wherein predetermined ones of the plurality of links having cutting edges are separated by straddle links.

7. In a chain saw cutting apparatus having a guide bar support member and a plurality of links connected to form a chain, predetermined ones of said links having side members spaced apart to straddle the guide bar, said spaced-apart side members providing means for connecting said predetermined ones of said links, an arcuate portion formed integrally with the spaced-apart side members to form a continuous, substantially rigid body element having a substantially U-shaped cross-section and, a cutting edge formed on the body element.

8. The cutting apparatus as set forth in claim 7 wherein each of the spaced-apart side members is provided with an aperture, the apertures being positioned substantially opposite each other and one having a diameter larger than the other, a rod means having a shank of one diameter adjacent one end and a smaller diameter adjacent the opposite end, the two diameters of the shank being such as to fit the apertures in the side members, and a flange on the end of the rod means adjacent the end having the larger diameter such that the distance between the spaced-apart side members is determined by the rod means.

References Cited in the file of this patent

UNITED STATES PATENTS

| | | |
|---|---|---|
| 865,118 | Muir | Sept. 3, 1907 |
| 2,231,190 | Peterson | June 26, 1917 |
| 2,391,286 | Wolf | Dec. 18, 1945 |
| 2,534,591 | Geurian | Dec. 19, 1950 |
| 2,632,484 | Merz | Mar. 24, 1953 |
| 2,664,120 | Hinkley | Dec. 29, 1953 |
| 2,746,494 | Cox | May 22, 1956 |
| 2,747,623 | Cox | May 29, 1956 |

FOREIGN PATENTS

| | | |
|---|---|---|
| 549,945 | Great Britain | Dec. 15, 1942 |
| 1,104,456 | France | June 15, 1955 |